US008675141B2

(12) United States Patent
Miller

(10) Patent No.: US 8,675,141 B2
(45) Date of Patent: Mar. 18, 2014

(54) CLOSED LOOP FEEDBACK FOR ELECTRONIC BEAM ALIGNMENT

(75) Inventor: Joshua O. Miller, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 663 days.

(21) Appl. No.: 12/690,530

(22) Filed: Jan. 20, 2010

(65) Prior Publication Data

US 2011/0176068 A1 Jul. 21, 2011

(51) Int. Cl.
  *H04N 3/22* (2006.01)
  *H04N 3/26* (2006.01)

(52) U.S. Cl.
  USPC ......................................................... 348/745

(58) Field of Classification Search
  USPC ........ 348/745, 744; 356/152.1, 153; 250/234, 250/205
  See application file for complete search history.

(56) References Cited

U.S. PATENT DOCUMENTS

| 5,991,015 | A | 11/1999 | Zamel et al. |
| 6,424,212 | B1 * | 7/2002 | Brandt ........................... 330/140 |
| 6,424,412 | B1 * | 7/2002 | Matthews ................... 356/152.1 |
| 6,808,270 | B2 * | 10/2004 | Nelson et al. .................... 353/69 |
| 2004/0041108 | A1 * | 3/2004 | Shaffer et al. ............... 250/559.3 |
| 2008/0037090 | A1 * | 2/2008 | Miller et al. .................... 359/212 |
| 2008/0042052 | A1 * | 2/2008 | Sprague et al. ............... 250/234 |
| 2008/0062161 | A1 | 3/2008 | Brown et al. |
| 2009/0167726 | A1 | 7/2009 | Sprague |
| 2010/0006741 | A1 * | 1/2010 | Nishioka et al. ........... 250/201.1 |

OTHER PUBLICATIONS

Microvision, Inc. "PCT International Search Report and Written Opinion", *ISR and Written Opinion for PCT Appl. No. PCT/US2011/021175* Sep. 30, 2011.

* cited by examiner

*Primary Examiner* — Michael Lee
(74) *Attorney, Agent, or Firm* — Kevin D. Wills

(57) ABSTRACT

Briefly, in accordance with one or more embodiments, a closed loop feedback system for electronic beam alignment in a scanned beam display comprises a light source to emit one or more light beams, a controller to provide a control signal to drive the light source, a scanning platform to receive the one or more light beams and scan the light beams in a scanning pattern to project an image, and an alignment detector to provide a feedback signal indicative of beam position information of the light beams in the far field to the controller. An optic may be disposed in the beam path to magnify and/or to transform beam position information into the far field for the one or more alignment detectors. The controller adjusts the control signal in response to the feedback signal received from the alignment detector to maintain alignment of the light beams in a far field.

15 Claims, 7 Drawing Sheets

US 8,675,141 B2

CLOSED LOOP FEEDBACK FOR ELECTRONIC BEAM ALIGNMENT

BACKGROUND

Scanned beam displays, which comprise multiple light sources, typically provide a mechanism by which misalignment of the beams may be corrected. To apply such a mechanism, an approach for recognizing the misalignment may be appreciated. In one approach, an imaging system may be used at the time of manufacture to measure the relative positions of the beams. In another approach, the user may visually observe the relative beam positions and make any needed adjustments via user actuated controls on the display system. The first approach may set the initial factory calibrations values, however it is not capable of compensating for any misalignment due to mechanical changes or instabilities over time. The second approach is subject to the skill of the user and tends to be a nuisance. Furthermore, as display resolutions increase beam alignment sensitivities scale and the user will more frequently have to provide sufficient beam adjustment to maintain the same level of image quality. In any event, a user may be an imperfect feedback loop mechanism and may not be capable of providing continuous adjustments during operation of the display.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
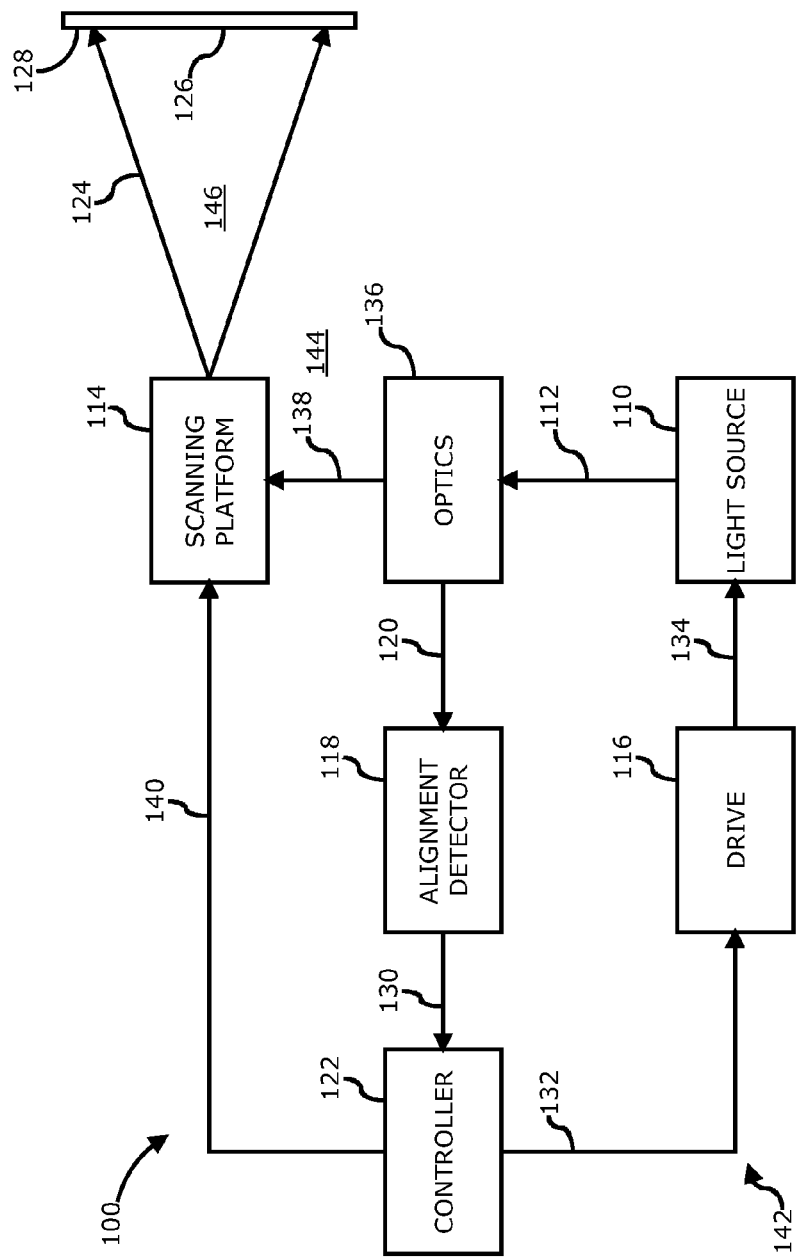
FIG. 1 is a block diagram of a closed loop feedback system for electronic beam alignment in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a closed loop feedback system for electronic beam alignment in accordance with one or more embodiments will be discussed. As shown in FIG. 1, a closed loop feedback system 100 is utilized in a display projector that generates a scanned beam as part of its operation to project a displayed image. An example of such a scanned beam display is shown in and described with respect to FIG. 6, below. During operation, a controller 122 provides scanning data to a drive circuit 116 via control signal 132. In turn, drive circuit 116 provides a drive signal 134 to a light source 110 which may comprise one or more light sources such as lasers or other types of lights. The drive signal 134 applied to light source 110 may control the timing of when light source 110 is turned on and when light source 110 is turned off. Furthermore, when light source 110 is turned on, the drive signal 134 may also control the intensity of the beam 112 generated by light source 110, for example by controlling the amount of drive voltage applied to light source 110. In one example embodiment, light source 110 may comprise three lasers to provide red (R), green (G), and blue (B) light, respectively, to generate a color (RGB) image projected by the display via the three beams generated by the laser light sources. Although an RGB scanned laser beam display will be discussed herein for purposes of example, other types of light sources and display systems may likewise be utilized, and the scope of the claimed subject matter is not limited in these respects.

In one or more embodiments, light source 110 generates one or more beams 112 that are processed by optics 136 which may comprise one or more optical elements such as lenses, prisms, beam combiners, filters, mirrors, and so on, to shape and/or combine the beams 112 into a beam 138 that is provided to a scanning platform 114. Scanning platform 114 receives beam 138 and is driven by controller 122 via control signal 140 to provide an output beam 124 that is scanned onto a projection surface 128 as projected image 126 by via scanning of the output beam 124 in an appropriate pattern or raster.

The projected image 126 may comprise a color image formed by pixels generated by position, timing, color, and intensity of the respective laser beams 112 provided by light source 110. The beams 112 provided by light source 110 should be aligned within a predetermined tolerance in order to provide a sufficient level of image quality in the projected image 126. In the event one or more of the beams become misaligned, the alignment of the beams is detected, and the drive signal applied to the lasers may be adjusted to sufficiently realign the beams. Such alignment adjustment may be accomplished via a closed loop 142 feedback arrangement by utilizing an alignment detector 118 to determine the alignment of one or more of the beams 112 provided by light source 110. In such an arrangement, alignment detector 118 picks off at least a portion of one or more of beams 112 and/or beam 138 as pickoff beam 120. Alignment detector 118 is capable of detecting alignment data of one or more of the beams 112 from the pickoff beam 120 and is capable of transducing the alignment data to an electrical signal as an alignment feedback signal 130 that is provided to controller 122. In one or more embodiments, alignment detector 118 may comprise any device capable of detecting a beam position and generating a signal indicative of the detected beam position. Examples of such devices that alignment detector 118 may comprise include a position sensitive diode (PSD), a quad-cell detector, detectors arrays, or an imaging sensor such as a charge-coupled device (CCD) or a complementary metal-oxide-semiconductor (CMOS) imager, among others. Controller 122 may then utilize alignment feedback signal 130 to adjust control signal 132 in response to misalignment of one or more of beams 112 to adjust the alignment of the beams to sufficiently reduce or eliminate the misalignment. For example, if one of the beams 112 is out of position where it should be placing a given pixel, controller 122 may adjust the timing of the pixel in control signal 132 to cause the pixel to appear later or earlier in a scan sweep of scanning platform 114 so that as a result the position of the pixel may be displaced in the projected image 126 to its desired location. In one or more alternative embodiments, various other methods may be utilized to provide adjustment and/or correction of a pixel in the projected image. For example, mechanical actuation may be employed to adjust light source 110, optics 136 such as beam shaping optics, beam combining optics and so on. In some embodiments, pixel adjustment and/or correction may involve a combination of electrical and/or mechanical feedback systems, and the scope of the claimed subject matter is not limited in these respects.

In one or more embodiments, as shown in FIG. 1, alignment detector 118 is capable of obtaining alignment data in the near field 144 prior to beam 138 impinging on scanning platform 114 and being translated into the coordinates of displayed image 126 in the far field 146. As a result, the beam alignment information obtained by alignment detector 118 represents alignment in the near field. In one or more embodiments, optics 136 may include one or more optics capable of transforming the beam position information from the near field to the far field prior to being detected by alignment detector 118, for example via application of a Fourier transform. In one or more alternative embodiments, controller 122 is capable of translating the near field alignment data obtained by alignment detector 118 into an adjustment for control signal 132 to result in an appropriate adjustment in the far field for displayed image 126. Example arrangements of how alignment detector 118 may obtain pick off beam 120 from optics 136 are shown in and described with respect to FIG. 2, FIG. 3, and/or FIG. 4, below.

Figure 2:
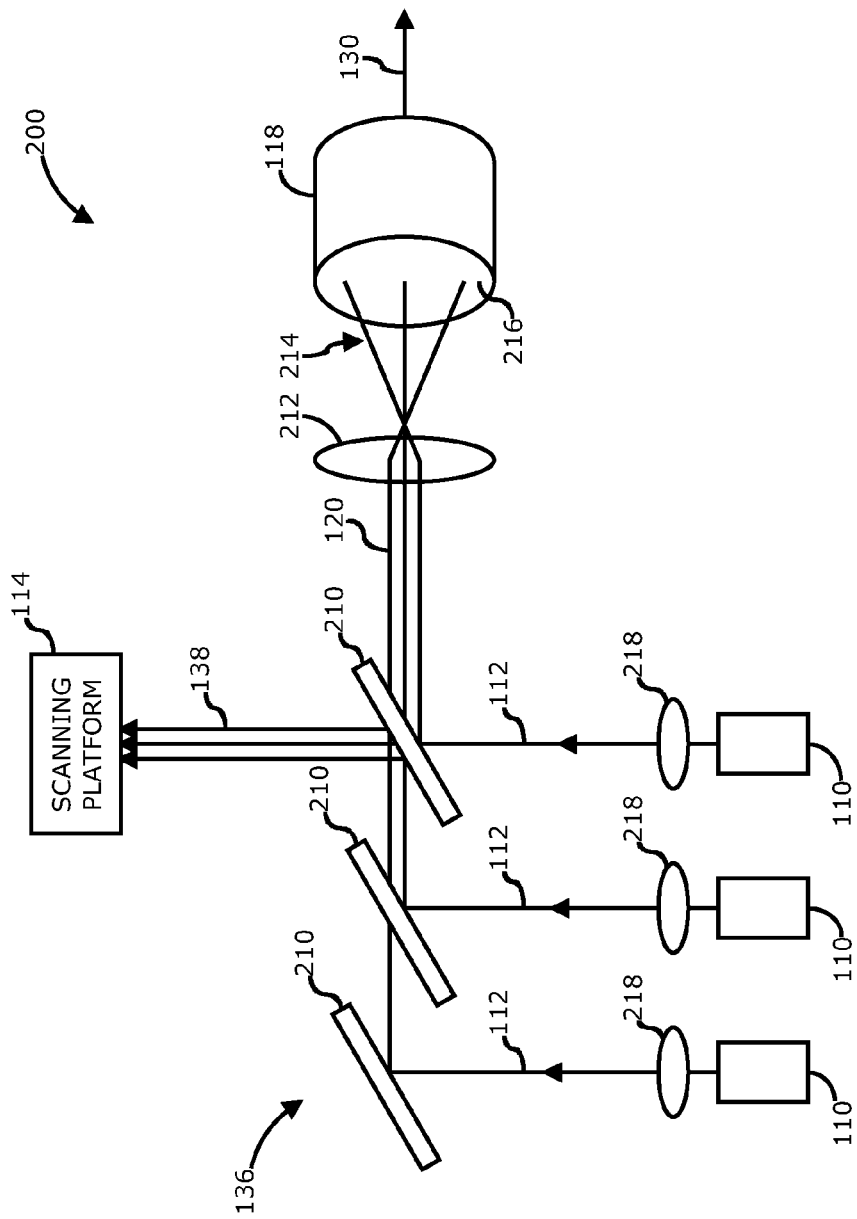
FIG. 2 is a diagram of a one arrangement of a detector to capture one or more beams in accordance with one or more embodiments.

Referring now to FIG. 2, a diagram of one arrangement of a detector to capture one or more beams in a closed loop feedback system in accordance with one or more embodiments will be discussed. As shown in FIG. 2, arrangement 200 includes one or more light sources 110 each providing a respective beam 112 to optics 136. For purposes of example, light sources 110 may comprise laser sources capable of producing a respective red, green, or blue (RGB) laser beam 112. Although FIG. 2 shows three light sources 110 each emitting a light beam of a respective wavelength, it should be noted that other light sources emitting light beams of other wavelengths, either visible or invisible wavelengths, for example infrared (IR) light, ultraviolet (UV) light, and so on, and the scope of the claimed subject matter is not limited in this respect. In one or more embodiments, one or more of the light sources 100 optionally may include a respective beam shaping optic 218 to shape the emitted beams 112. For example, the beam shaping optics 218 may provide a collimating function and/or or a beam profile shaping function although the scope of the claimed subject matter is not limited in this respect. The laser beams 112 impinge on respective optical elements 210 for reflecting and/or combining the laser beams 112 into a combined output beam 138 that is applied to scanning platform 114. In the example shown in FIG. 2, the optical elements 210 may comprise dichroic beam combiner elements, either two or more separate elements and/or respective surfaces of a single dichroic combiner (not shown) in one or more alternative embodiments, and the scope of the claimed subject matter is not limited in this respect. It should be noted that the beam alignment detection and adjustment as discussed herein may be utilized with a beam combiner in some embodiments, and in other embodiments beam combining may not be utilized. In any event, beam alignment detection and adjustment may be performed with or without involving beam combining wherein the beam alignment may be detected in whatever state the beam or beams are in, and an appropriate adjustment may be made accordingly, and the scope of the claimed subject matter is not limited in this respect. When the laser RGB beams 112 are combined into a single beam 138, beam 138 may be referred to as a white beam due to its complete visible color content, although the actual beam color at any given instant in time may be dependent on the particular pixel in the image being projected. In one or more alternative embodiments, the combined single beam 138 may include wavelengths that may or may not comprise a display pixel and that may be utilized for other purposes, for example where IR or UV light beams are utilized, and the scope of the claimed subject matter is not limited in this respect. One or more of the beams 112 may be picked off directly from at least one of the dichroic beam combiner elements 210 as one or more pick off beams 120. The pick off beams 120 impinge on a sensor surface 216 of alignment detector 118. Optionally, in one or more embodiments, an optic 212 may be utilized to transform the beam into the far field as well as magnify the pick off beams 120 such that any misalignment of the pick off beams 120 is increased at 214, thereby increasing the sensitivity of alignment detector 118 to the misalignment of the pick off beams 120. With the lens 212 present in the path pick off beam 120, the alignment measurement is no longer measured in the near field. Although the resulting beams at 214 are not necessarily an identical representation of the image plane due to factors such as magnification, the image is transformed by the optic at 214 to the far field so that fewer assumptions and/or less processing is required in controller 122 wherein a better representation of any beam misalignment may be realized. In accordance with one or more embodiments, although one function of lens 212 disposed prior to alignment detector 118 may be to provide magnification, a primary function of lens 212 may be to apply a Fourier transform on pick off beam 120 before pick off beam 120 impinges alignment detector 118 so that beam 120 is in the far field at region 214 and is representative of the output beam 124 as observed by the user on projection surface 128. Such an arrangement is capable of simplifying the control algorithm implemented by controller 122. However, the Fourier transform likewise may be at least partially or wholly implemented electronically by controller 122, or alternatively the Fourier transform function may be implemented optically and electronically via a combination of optic 212 and controller 122, and the scope of the claimed subject matter is not limited in this respect.

Thus, in contrast to the previously discussed system in FIG. 1, the detection of the alignment of the pick off beams 120 may be performed in the far field as a result of the inclusion of the optic 212. As a result, the alignment feedback signal 130 provided to controller 122 by alignment detector 118 may provide information regarding the alignment of the beams represented in the image space alleviating the need for controller 122 to apply a transform function and simply monitor changes in beam position on the detector, so that controller 122 may accommodate for any misalignment accordingly. Furthermore, since the position information of the pick off beams 120 may also be magnified via optic 212, controller 122 may further accommodate the magnified position information applied to the position information of the beams as received in alignment feedback signal 130 so that the alignment feedback signal 130 does not likewise magnify the adjustment to the beam positions in the far field. As a result, a finer level of granularity in beam misalignment may be detected which may be increasingly useful as the resolution of the displayed image 126 is increased. In one or more embodiments, beam alignment adjustment correction may be performed on one or more individual beams, for example by measuring a delta between an initial position of a beam and a detected present position of the beam by adjusting the beam position to reduce or eliminate the delta. Furthermore, where two or more beams share a common alignment detector 118, the beams will have a common coordinate plane, in which case adjustment or correction of the beams may be performed relative to the position of one or more other beams instead of correcting with respect to an absolute position. As a result, if two or more beams shift in the same direction less compensation may be involved to realign them. Thus, FIG. 2 illustrates how alignment detector 118 may obtain one or more pick off beams 120 directly from the dichroic beam combiner elements 210 of optics 136 with optional magnification of the pick off beams 120 via optic 212. For example, if the shift of beam 1 is +1 in the Y direction and the shift of beam 2 is +3 in the Y direction, the positions of beam 1 and beam 2 may be monitored relative to one another, and the compensation in this case may only involve a beam shift of −2 in the Y direction for beam 2. Furthermore, in one or more embodiments, alignment detector 118 may be utilized in place of present photodetectors that are used to monitor optical power of the laser beams and/or to monitor color balance in a color type display in addition to monitoring for beam position alignment detection as discussed herein. An alternative arrangement for obtaining pick off beams 120 is shown in and described with respect to FIG. 3 and/or FIG. 4, below.

Figure 3:
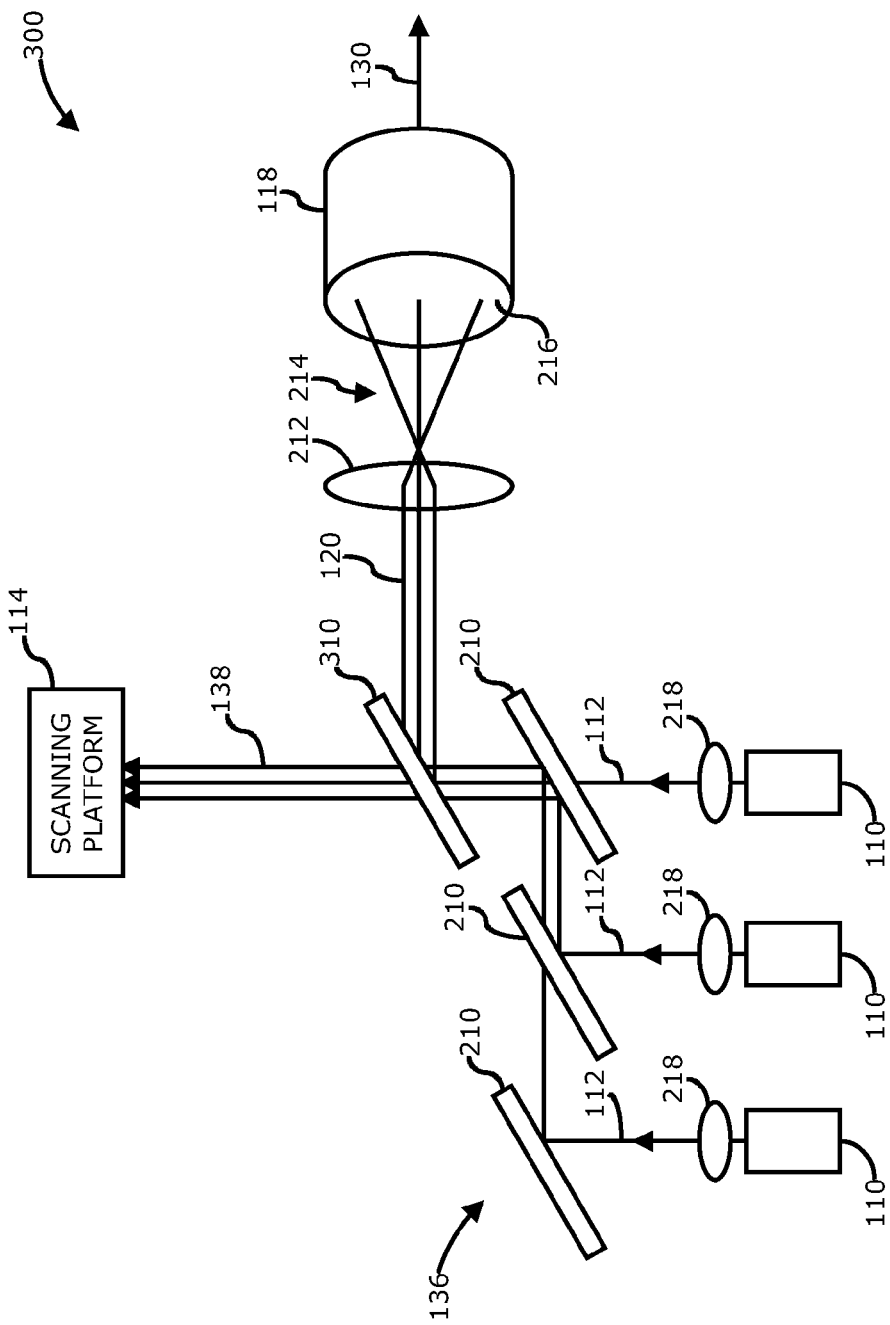
FIG. 3 is a diagram of an alternative arrangement of a detector to capture one or more beams in accordance with one or more embodiments.

Referring now to FIG. 3, a diagram of an alternative arrangement of a detector to capture one or more beams in a closed loop feedback system in accordance with one or more embodiments will be discussed. Arrangement 300 of FIG. 3 is substantially similar to arrangement 200 of FIG. 2, above, expect that the pick off beams 120 may be obtained with a separate optical element 310 as shown in FIG. 3. Optical element 310 may be disposed in the path of beams 138 exiting optics 136 wherein one or more pick off beams 120 may be reflected off of optical element 310 while allowing beams 138 to pass there through and impinge on scanning platform 114 to be scanned. As with arrangement 200, a magnifying optic 212 may be utilized in arrangement 300 to magnify the alignments of beams 120 when they impinge on the sensor surface 216 of alignment detector 118 at 214 wherein the alignment detection sensitivity of alignment detector 118 may be increased. Controller 112 may apply a Fourier transform function to convert near field beam position information into far field beam position information and to further accommodate for the magnification function applied to the alignment position information of pick off beams 120. Other arrangements for detecting the beam alignment with alignment detector 118 are likewise possible, for example pick off beams 120 may obtained in the far field 146 after scanning platform 114, and the scope of the claimed subject matter is not limited in this respect. Furthermore, as with the embodiment shown in FIG. 2, although FIG. 3 shows three light sources 110 each emitting a light beam of a respective wavelength, it should be noted that other light sources emitting light beams of other wavelengths, either visible or invisible wavelengths, for example infrared (IR) light, ultraviolet (UV) light, and so on, and the scope of the claimed subject matter is not limited in this respect. Optionally, in one or more embodiments, an optic 212 may be utilized to transform the beam into the far field as well as magnify the pick off beams 120 such that any misalignment of the pick off beams 120 is increased at 214, thereby increasing the sensitivity of alignment detector 118 to the misalignment of the pick off beams 120. With the lens 212 present in the path pick off beam 120, the alignment measurement is no longer measured in the near field. Although the resulting beams at 214 are not necessarily an identical representation of the image plane due to factors such as magnification, the image is transformed by the optic at 214 to the far field so that fewer assumptions and/or less processing is required in controller 122 wherein a better representation of any beam misalignment may be realized. In contrast to the previously discussed system in FIG. 1, the detection of the alignment of the pick off beams 120 may be performed in the far field as a result of the inclusion of the optic 212. As a result, the alignment feedback signal 130 provided to controller 122 by alignment detector 118 may provide information regarding the alignment of the beams represented in the image space alleviating the need for controller 122 to apply a transform function and simply monitor changes in beam position on the detector, so that controller 122 may accommodate for any misalignment accordingly. Furthermore, since the position information of the pick off beams 120 may also be magnified via optic 212, controller 122 may further accommodate the magnified position information applied to the position information of the beams as received in alignment feedback signal 130 so that the alignment feedback signal 130 does not likewise magnify the adjustment to the beam positions in the far field. As a result, a finer level of granularity in beam misalignment may be detected which may be increasingly useful as the resolution of the displayed image 126 is increased. Thus, FIG. 2 illustrates how alignment detector 118 may obtain one or more pick off beams 120 directly from the dichroic beam combiner elements 210 of optics 136 with optional magnification of the pick off beams 120 via optic 212. Another alternative arrangement for obtaining pick off beams 120 is shown in and described with respect to FIG. 4, below.

Figure 4:
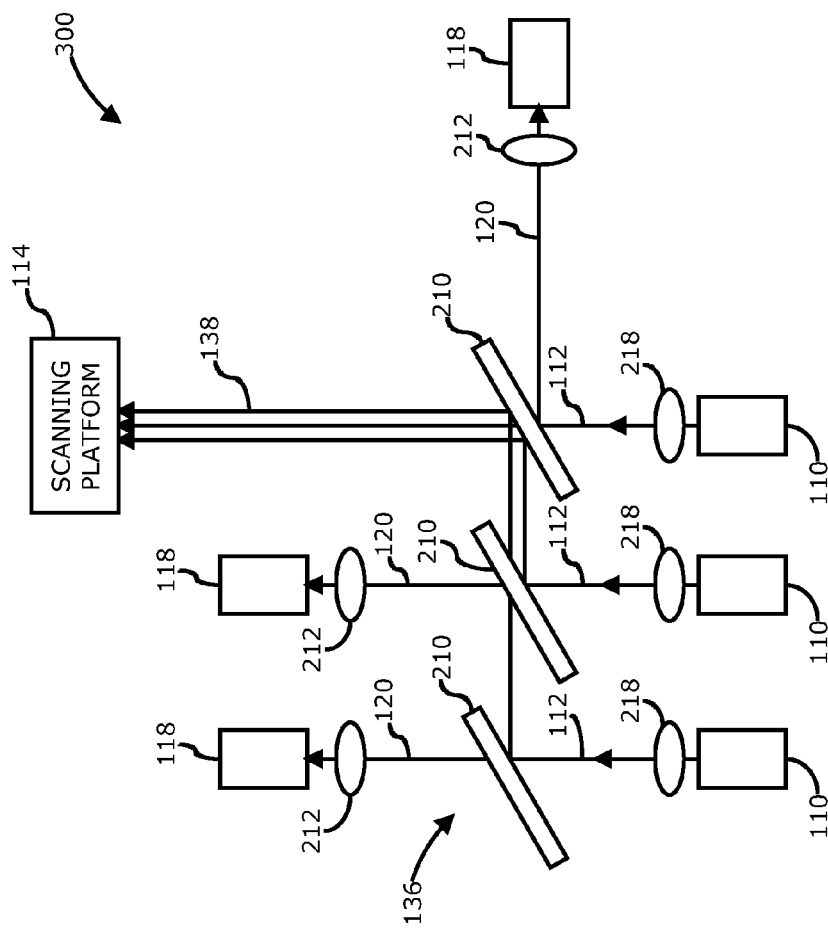
FIG. 4 is a diagram of another alternative arrangement of one or more detectors to capture one or more beams in a closed loop feedback system in accordance with one or more embodiments.

Referring now to FIG. 4, a diagram of another alternative arrangement of one or more detectors to capture one or more beams in a closed loop feedback system in accordance with one or more embodiments will be discussed. In contrast to either arrangement 300 of FIG. 3 or arrangement 200 of FIG. 2, above, each beam 112 may also be picked off as separate pick off beams 120, collected and monitored discretely and uniquely from the other beam paths from the other light sources 110. Optical elements 210 may be disposed in the paths of beams 112 exiting optics 218 wherein one or more pick off beams 120 may be reflected off of or transmitted through the respective optical element 210 while allowing beams 138 to pass there through and impinge on scanning platform 114 to be scanned. As with arrangement 200 and 300, a transforming and magnifying optic 212 may be utilized in each respective beam path to magnify the alignments of beams 120 at the respective alignment detectors 118. In the case shown in FIG. 4 wherein a single pickoff beam 120 is incident on respective, unique detector 118, the algorithm implemented by controller 122 to compensate for any beam misalignment may be based at least in part on measurements of change position of that beam relative to its initial position and compensating for the detected delta between the initial beam position and the present beam position. Other arrangements for detecting the beam alignment with one or more alignment detector 118 are likewise possible, for example pick off beams 120 may obtained in the far field 146 after scanning platform 114, and the scope of the claimed subject matter is not limited in this respect.

Figure 5:
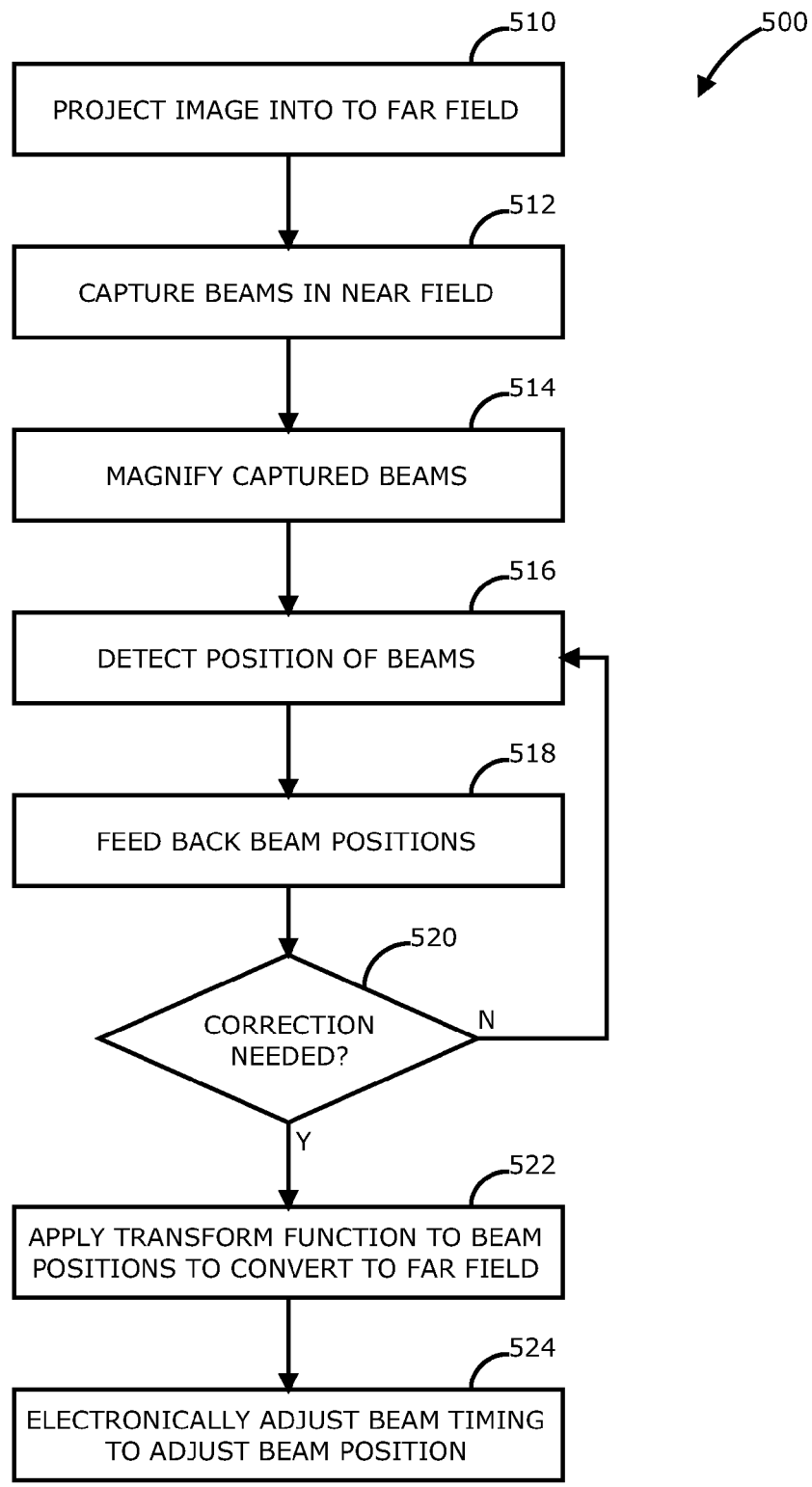
FIG. 5 is a flow diagram of a method to detect and adjust beam alignment in a closed loop feedback system in accordance with one or more embodiments.

Referring now to FIG. 5, a flow diagram of a method to detect and adjust beam alignment in a closed loop feedback system in accordance with one or more embodiments will be discussed. FIG. 5 shows one particular method 500 by which a closed loop beam alignment detection and adjustment system 100 as shown in FIG. 1 may operate. However, it should be noted that in one or more alternative embodiments method 500 may include more or fewer blocks than shown in FIG. 5, and/or the blocks may be in a different order than shown in FIG. 5, and the scope of the claimed subject matter is not limited in these respects. In method 500, an image generated by a scanned beam display may be projected into the far field at block 510. The scanned beams may be captured in the near field at block 512, for example as pick off beams 120. Optionally, the captured beams may be magnified at block 514, for example by magnifying optic 212. A detector such as alignment detector 118 may detect the position of one or more of the captured beams at block 516 wherein the positions of the captured beams in the near field is indicative of the positions of the scanned beams as projected into the far field. The detected beam positions are feed back at block 518 to controller 122, for example as an alignment feedback signal 130. A determination may be made at decision block 520 if any correction or adjustment in the beam positions is needed, for example as decided by controller 122 based at least in part on the alignment feedback signal 130. If no correction or adjustment in the beam positions is needed, then method 500 may continue to operate to detect the position of the beams and feed back the detected beam positions. transform function may be applied at block 422 to the detected beam positions to convert near field beam position information into far field beam position information, and/or to undo any magnification function that may have been applied to the detected beam positions at block 514. Such a transform function may be applied optically by optic 212 and/or electronically by controller 122. In the event correction or adjustment of the beam positions is needed, the beam timing may then be electronically adjusted at block 524 to adjust the beam positions in the projected image 126 in the far field 146. Alternatively, the beam positions may be corrected mechanically at least in part. An example scanned beam display capable of implementing the closed loop feedback method 400 for beam alignment is shown in and described with respect to FIG. 6, below.

Figure 6:
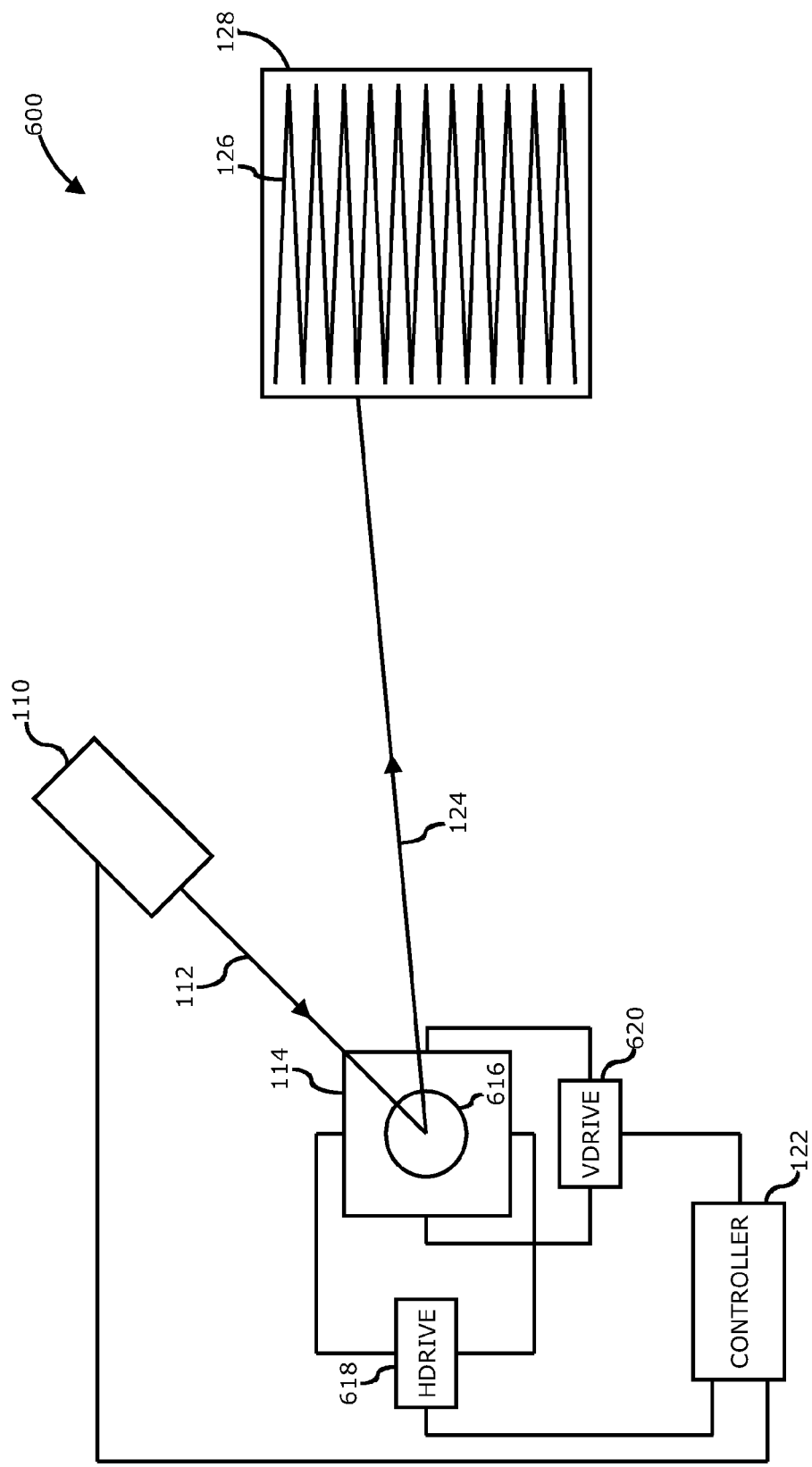
FIG. 6 is a diagram of a scanned beam display in accordance with one or more embodiments.

Referring now to FIG. 6, a diagram of a scanned beam display in accordance with one or more embodiments will be discussed. Although FIG. 6 illustrates one type of scanned beam display for purposes of discussion, for example a microelectromechanical system (MEMS) based display, it should be noted that other types of scanning displays including those that use two uniaxial scanners, rotating polygon scanners, or galvonometric scanners as well as systems that use the combination of a one-dimensional spatial light modulator with a single axis scanner as some of many examples, may also implement a closed loop control system 100 of FIG. 1, and the scope of the claimed subject matter is not limited in this respect. In general, any type of display system in which beam alignment is involved may incorporate the closed loop feedback system 100 of FIG. 1 for electronic beam alignment as discussed herein. Details of operation of an example scanned beam display 600 are discussed, below.

As shown in FIG. 6, scanned beam display 600 comprises a light source 110, which may be one or more laser light sources or collimate beam light sources such as a laser or the like, capable of emitting a beam 112 which may comprise a laser beam and/or a collimated beam. In some embodiments, light source 110 may comprise two or more light sources, such as in a color system having red, green, and blue light sources, wherein the beams from the light sources may be combined into a single beam to project a color image. In one or more embodiments, light source 110 may include one or more visible wavelength light sources such as a red, green, and/or blue light source, and/or in addition may include one or more invisible wavelength light sources to emit an invisible beam such as an ultraviolet beam or an infrared beam. The beam 112 is incident on a scanning platform 114 which may comprise a microelectromechanical system (MEMS) based scanner or the like in one or more embodiments, wherein beam 112 is reflected by scanning mirror 616 to generate a controlled output beam 124. In one or more alternative embodiments, scanning platform 114 may comprise a diffractive optic grating, a moving optic grating, a light valve, a rotating mirror, a spinning silicon device, a digital light projector device, a flying spot projector, or a liquid-crystal on silicon device, or other similar scanning or modulating devices. A horizontal drive circuit 618 and/or a vertical drive circuit 620 modulate the direction in which scanning mirror 516 is deflected to cause output beam 124 to generate displayed image 126 via a scanning pattern or raster, wherein the displayed image 126 is displayed on a display screen 128 and/or image plane. Controller 122 controls horizontal drive circuit 618 and vertical drive circuit 620 by converting pixel information of the displayed image 126 into laser modulation synchronous to the scanning platform 114 to write the image information as a displayed image 126 based upon the position of the output beam 124 in raster pattern 126 and the corresponding intensity and/or color information at the corresponding pixel in the image. Controller 122 may also control other various functions of scanned beam display 600, and in one or more embodiments may execute a program of instructions to implement method 500 of FIG. 5.

In one or more embodiments, for two dimensional scanning to generate a two dimensional image, a horizontal axis may refer to the horizontal direction of a scanning pattern, and the vertical axis may refer to the vertical direction of the scanning pattern. Scanning mirror 616 may sweep the output beam 124 horizontally at a relatively higher frequency and also vertically at a relatively lower frequency. The result is a scanned trajectory of laser beam 124 to result in projected image 126. The fast and slow axes may also be interchanged such that the fast scan is in the vertical direction and the slow scan is in the horizontal direction. However, the scope of the claimed subject matter is not limited in these respects.

In one or more particular embodiments, the scanned beam display 600 as shown in and described with respect to FIG. 6 may comprise a pico-projector developed by Microvision Inc., of Redmond, Wash., USA, referred to as PicoP™. In such embodiments, light source 110 of such a pico-projector may comprise one red laser, one green laser, and one blue laser with a lens near the output of the respective lasers that collects the light from a respective laser and provides a very low numerical aperture (NA) beam as beam 112. The light from the lasers may then be combined with dichroic elements such as elements 210 of FIG. 2, FIG. 3 and/or FIG. 5 into a single combined beam 112. Using a beam splitter and/or basic fold-mirror optics as part of optics 136, the combined beam 112 may be relayed onto biaxial MEMS scanning mirror 616 disposed on scanning platform 114 that scans the output beam 124 in a scanning pattern to result in a projected image 126. Modulating the lasers synchronously with the position of the scanned output beam 124 may create the desired projected image 126. In one or more embodiments, the scanned beam display 600, or engine, may be disposed in a single module known as an Integrated Photonics Module (IPM), which in some embodiments may be 7 millimeters (mm) in height and less than 5 cubic centimeters (cc) in total volume, although the scope of the claimed subject matter is not limited in these respects. An example information handling system coupled to or incorporating scanned beam display 600 as such an integrated photonics module is shown in and described with respect to FIG. 7, below.

Figure 7:
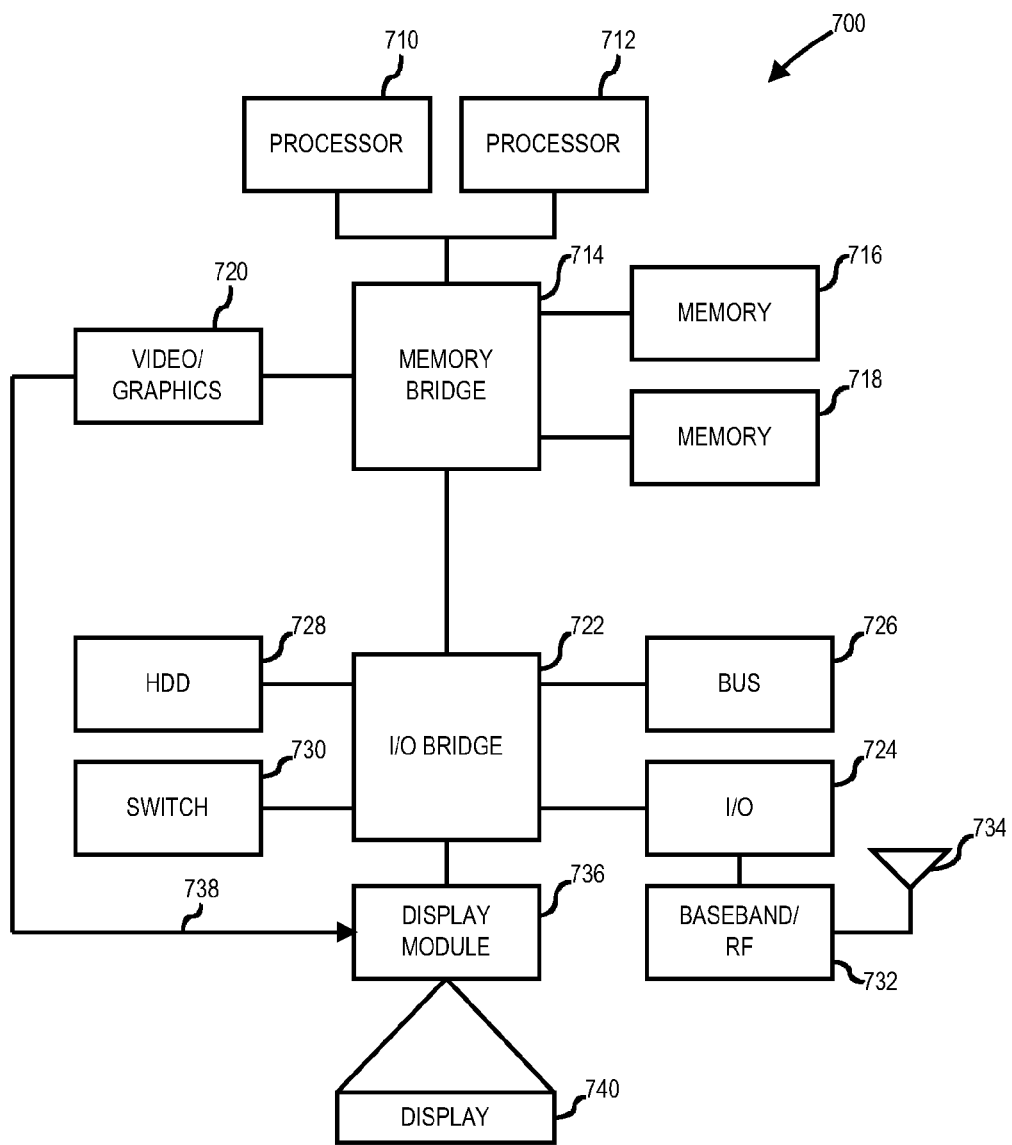
FIG. 7 is a block diagram of an information handling system capable of utilizing a display having a closed loop feedback system for electronic beam alignment in accordance with one or more embodiments.

Referring now to FIG. 7, a block diagram of an information handling system capable of utilizing a display having a closed loop feedback system for electronic beam alignment in accordance with one or more embodiments. Information handling system 700 of FIG. 7 may tangibly couple to or incorporate scanned laser display 600 as shown in and described with respect to FIG. 6, above. Although information handling system 700 represents one example of several types of computing platforms, including cell phones, personal digital assistants (PDAs), netbooks, notebooks, internet browsing devices, and so on, information handling system 700 may include more or fewer elements and/or different arrangements of the elements than shown in FIG. 7, and the scope of the claimed subject matter is not limited in these respects.

Information handling system 700 may comprise one or more processors such as processor 710 and/or processor 712, which may comprise one or more processing cores. One or more of processor 710 and/or processor 712 may couple to one or more memories 716 and/or 718 via memory bridge 714, which may be disposed external to processors 710 and/or 712, or alternatively at least partially disposed within one or more of processors 710 and/or 712. Memory 716 and/or memory 718 may comprise various types of semiconductor based memory, for example volatile type memory and/or non-volatile type memory. Memory bridge 714 may couple to a video/graphics system 720 to drive a display device, which may comprise display module 736, coupled to and/or incorporated in information handling system 700. In one or more embodiments, video/graphics system 720 may couple to one or more of processors 710 and/or 712 and may be disposed on the same core as the processor 710 and/or 712, although the scope of the claimed subject matter is not limited in this respect.

Information handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information handling system 700. Bus system 726 may comprise one or more bus systems such as a peripheral component interconnect (PCI) express type bus or the like, to connect one or more peripheral devices to information handling system 700. A hard disk drive (HDD) controller system 728 may couple one or more hard disk drives or the like to information handling system, for example Serial Advanced Technology Attachment (Serial ATA) type drives or the like, or alternatively a semiconductor based drive comprising flash memory, phase change, and/or chalcogenide type memory or the like. Switch 730 may be utilized to couple one or more switched devices to I/O bridge 722, for example Gigabit Ethernet type devices or the like. Furthermore, as shown in FIG. 7, information handling system 700 may include a baseband and radio-frequency (RF) block 732 comprising a base band processor and/or RF circuits and devices for wireless communication with other wireless communication devices and/or via wireless networks via antenna 734, although the scope of the claimed subject matter is not limited in these respects.

In one or more embodiments, information handling system 700 may include a display module 736 that may correspond to scanned beam display 600 of FIG. 6, and which may include any one or more or all of the components of scanned laser display 600 such as controller 122, horizontal drive circuit 618, vertical drive circuit 620, and/or light source 110. In one or more embodiments, display module 736 may be controlled by one or more of processors 710 and/or 712 to implement some or all of the functions of controller 122 of FIG. 1 including closed feedback loop system 100 of FIG. 1. In one or more embodiments, display module 736 may comprise a MEMS based scanned laser beam display for displaying an image projected by display module 736 where the displayed image 126 may likewise be represented by display 740. In one or more embodiments, a scanned beam display engine may comprise video/graphics block 720 having a video controller to provide video information 738 to display module 736 to display an image represented by display 740. In one or more embodiments, such a display module 736 may include closed feedback loop system 100 of FIG. 1 as described herein. However, these are merely example implementations for display module 736 within information handling system 700, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to closed loop feedback for electronic beam alignment and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus, comprising:
a plurality of light sources to emit a plurality of light beams;
a controller to provide a plurality of control signals to drive the plurality of light sources;
a scanning platform to receive the plurality of light beams and scan the plurality of light beams in a scanning pattern to project an image;
one or more alignment detectors to provide a feedback signal indicative of relative beam position information of the plurality of light beams to the controller; and
an optic disposed in a beam path of the plurality of light beams prior to the scanning platform to direct a pick-off beam to the one or more alignment detectors and to transform the beam position information of the plurality of light beams into a far field for the one or more alignment detectors;
wherein the controller adjusts timing of when at least one of the plurality of light sources is turned on and turned off by adjusting timing of at least one of the plurality of control signals in response to the feedback signal received from the one or more alignment detectors to maintain electronic alignment of the light beams in a far field.

2. An apparatus as claimed in claim 1, further comprising a magnifying optic disposed prior to the one or more alignment detectors to magnify the beam position information detected by the alignment detector.

3. An apparatus as claimed in claim 1, wherein the one or more alignment detectors comprises a position sensitive diode, a quad-cell detector, detector array, or an imaging sensor, or combinations thereof.

4. An apparatus as claimed in claim 1, wherein the controller applies a transform signal to the feedback signal to transform near field beam position information into far field beam position information for the adjustment to the control signal.

5. A method, comprising:
scanning a plurality of light beams to project an image into a far field;
capturing of the plurality of light beams in a near field, said capturing being performed prior to scanning;
transforming the captured beams of light to a far field to provide a feedback signal indicative of relative beam position information of the light beams in the far field;
determining from the feedback signal if adjustment of one or more of the light beams is needed; and
if adjustment of one or more of the light beams is needed, adjusting a control signal used to control on/off timing of light sources that generate the plurality of light beams in response to the feedback signal to maintain electronic alignment of the plurality of light beams in the far field.

6. A method as claimed in claim 5, said adjusting comprising applying a beam position compensation algorithm based at least in part on a unique detector monitoring a single beam and monitoring deviation of the single beam from an initial position.

7. A method as claimed in claim 5, said adjusting comprising applying a beam position compensation algorithm based at least in part on a common detector monitoring two or more beams and monitoring a relative deviation among the two or more beams.

8. A method as claimed in claim 5, said transforming comprising applying a Fourier transform to transfer one or more of the captured light beams to the far field prior to providing the feedback signal.

9. A method as claimed in claim 5, further comprising magnifying one or more of the captured light beams prior to providing the feedback signal.

10. A method as claimed in claim 5, further comprising applying a transform signal to the feedback signal to transform near field beam position information into far field beam position information for said adjusting the control signal.

11. An information handling system, comprising:
a processor and a memory coupled to the processor, wherein video information is stored in the memory;
a plurality of light sources to emit a plurality of light beams;
a controller to provide a control signal to drive the plurality of light sources according to the video information;
a scanning platform to receive the a plurality of light beams and scan the light beams in a scanning pattern to project an image representative of the video information;
one or more alignment detectors to provide a feedback signal indicative of relative beam position information of the light beams to the controller;
a pick off optic disposed in a path of the plurality of light beams applied to the scanning platform, wherein the alignment detector obtains one or more pick off beams from the pick off optic to provide the feedback signal from the one or more pick off beams; and
an optic disposed in a beam path of the one or more pick off beams to transform beam position information of the light beams into a far field for the one or more alignment detectors;
wherein the controller controls on/off timing of the plurality of light sources by adjusting timing of the control signal in response to the feedback signal received from the one or more alignment detectors to maintain electronic alignment of the light beams in the far field.

12. An information handling system as claimed in claim 11, further comprising a magnifying optic disposed prior to the alignment detector to magnify the beam position information detected by the alignment detector.

13. An information handling system as claimed in claim 11, wherein the alignment detector comprises a position sensitive diode, a quad-cell detector, detector array or an imaging sensor, or combinations thereof.

14. An information handling system as claimed in claim 11, wherein the processor and the controller are the same device.

15. An information handling system as claimed in claim 11, wherein the processor applies a transform signal to the feedback signal to transform near field beam position information into far field beam position information for the adjustment to the control signal.

* * * * *